UNITED STATES PATENT OFFICE.

BENNO HOMOLKA AND OTTO LIEBKNECHT, OF FRANKFORT-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

PROCESS OF MAKING INDOXYL, &c.

SPECIFICATION forming part of Letters Patent No. 704,804, dated July 15, 1902.

Application filed September 4, 1901. Serial No. 74,319. (No specimens.)

*To all whom it may concern:*

Be it known that we, BENNO HOMOLKA, Ph. D., and OTTO LIEBKNECHT, Ph. D., citizens of the Empire of Germany, residing at Frankfort-on-the-Main, Germany, have invented certain new and useful Improvements in Processes of Making Indoxyl, &c., of which the following is a specification.

We have found that a good yield of indoxyl may be obtained by the action of sodium amid on the so-called "phenylglycinphenylglycin," (phenylglycinphenylglycid:)

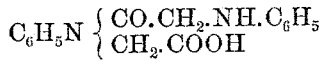

(*Journ. f. Prakt. Chem.* (2) 40.432; Ber. XXII, 1803; Beilstein III, Edit. Vol. 2, p. 430.) The formation of indoxyl occurs already at the melting-point of the sodium amid—that is to say, at about 125° centigrade—more rapidly and completely, however, at a higher temperature, preferably at about 200° centigrade. The action of the sodium amid on the phenylglycinphenylglycin being lively, it is best to operate with suitable diluents. As such are specially appropriate the alkali hydroxids and the alkali cyanids or mixtures thereof.

The general mode of working consists by introducing the phenylglycinphenylglycin, preferably in form of its salt, into the melting sodium amid with or without suitable diluents or by introducing the mixture of phenylglycinphenylglycin and sodium amid, the former preferably as salt, with or without diluents, into retorts appropriately heated beforehand, &c.

The practical carrying out of the process may be illustrated, for instance, as follows:

*Manufacture of indoxyl from phenylglycinphenylglycin.*—In a suitable retort-like vessel is molten a mixture of forty-five kilograms of caustic potash, thirty-five kilograms of caustic soda, and fifteen kilograms of sodium amid or a mixture of fifteen kilograms of potassium cyanid and fifteen kilograms of sodium amid, and the melting mass is introduced at about 180° to 210° centigrade into fifteen kilograms of the potassium salt of phenylglycinphenylglycin. The ammonia escaping hereby facilitates the necessary exclusion of air. The melt is complete as soon as the evolution of ammonia diminishes. When cold, it is poured into water and transformed in the usual manner into indoxyl or indigo.

If in the above example phenylglycinphenylglycin be substituted by one of its homologues, especially ortho-tolylglycin-ortho-tolylglycin, (*Journ. f. Prakt. Chem.* (2) 38.302; Beilstein III, Vol. 2, p. 470,) or by para-tolylglycin-para-tolylglycin, then the known homologous indoxyls or indigoes may be obtained.

Having now described our invention, what we claim is—

1. The herein-described process of making indoxyl, which consists in causing sodium amid to act at a high temperature preferably with suitable diluents on phenylglycinphenylglycin (phenylglycinphenylglycid), substantially as set forth.

2. The herein-described process of making indoxyl, which consists in reacting with sodium amid at a high temperature on a homologous phenylglycinphenylglycid, substantially as set forth.

In testimony that we claim the foregoing as our invention we have signed our names in presence of two subscribing witnesses.

BENNO HOMOLKA.
OTTO LIEBKNECHT.

Witnesses:
ALFRED BRISBOIS,
HEINRICH HAHN.